United States Patent [19]
McKinney

[11] 4,010,094
[45] Mar. 1, 1977

[54] COMBUSTING FLUE GAS IN A CRACKING CATALYST REGENERATION PROCESS

[75] Inventor: Claude O. McKinney, Munster, Ind.

[73] Assignee: Standard Oil Company, Chicago, Ill.

[22] Filed: May 9, 1975

[21] Appl. No.: 576,122

Related U.S. Application Data

[63] Continuation of Ser. No. 451,140, March 14, 1974, abandoned.

[52] U.S. Cl. .............................. 208/164; 252/416; 252/417
[51] Int. Cl.² ........................................ C10G 11/18
[58] Field of Search ............ 208/164; 252/416, 417

[56] References Cited

UNITED STATES PATENTS

| | | | |
|---|---|---|---|
| 2,684,931 | 7/1954 | Berg | 208/164 |
| 2,756,121 | 7/1956 | Grimes | 252/416 |
| 3,012,962 | 12/1961 | Dygert | 208/164 |
| 3,363,993 | 1/1968 | Campbell | 252/417 |
| 3,808,121 | 4/1974 | Wilson | 252/417 |
| 3,838,036 | 9/1974 | Stine et al. | 208/164 |
| 3,909,392 | 9/1975 | Horecky et al. | 208/120 |

Primary Examiner—Herbert Levine
Attorney, Agent, or Firm—Morton, Bernard, Brown, Roberts & Sutherland

[57] ABSTRACT

Flue gas containing $CO_2$ and CO from a fluidized cracking unit catalyst regenerator is fed to a combustor in which CO combustion is completed. The CO combustion can be enhanced by injection of air or oxygen-containing gas into the combustor. The combustor may include CO combustion promoters such as oxidation-promoting catalyst grids, and may also include auxiliary fuel injection or other means to initiate or facilitate the combustion. The process of this invention further comprises indirect or direct recovery of the heat resulting from the combustion of CO in the flue gas by the cracking catalyst particles, which may be returned separately to the regenerator bed or transferred to the cracking reactor with or without fresh catalyst, or may be recycled to the CO combustor inlet or combined with other catalyst particles passing to the regenerator. In a preferred embodiment of this invention, combustion of CO in the flue gas occurs in two or more different stages to permit close catalyst temperature control and optional multiple use of the heat recovered by the catalyst particles.

15 Claims, 1 Drawing Figure

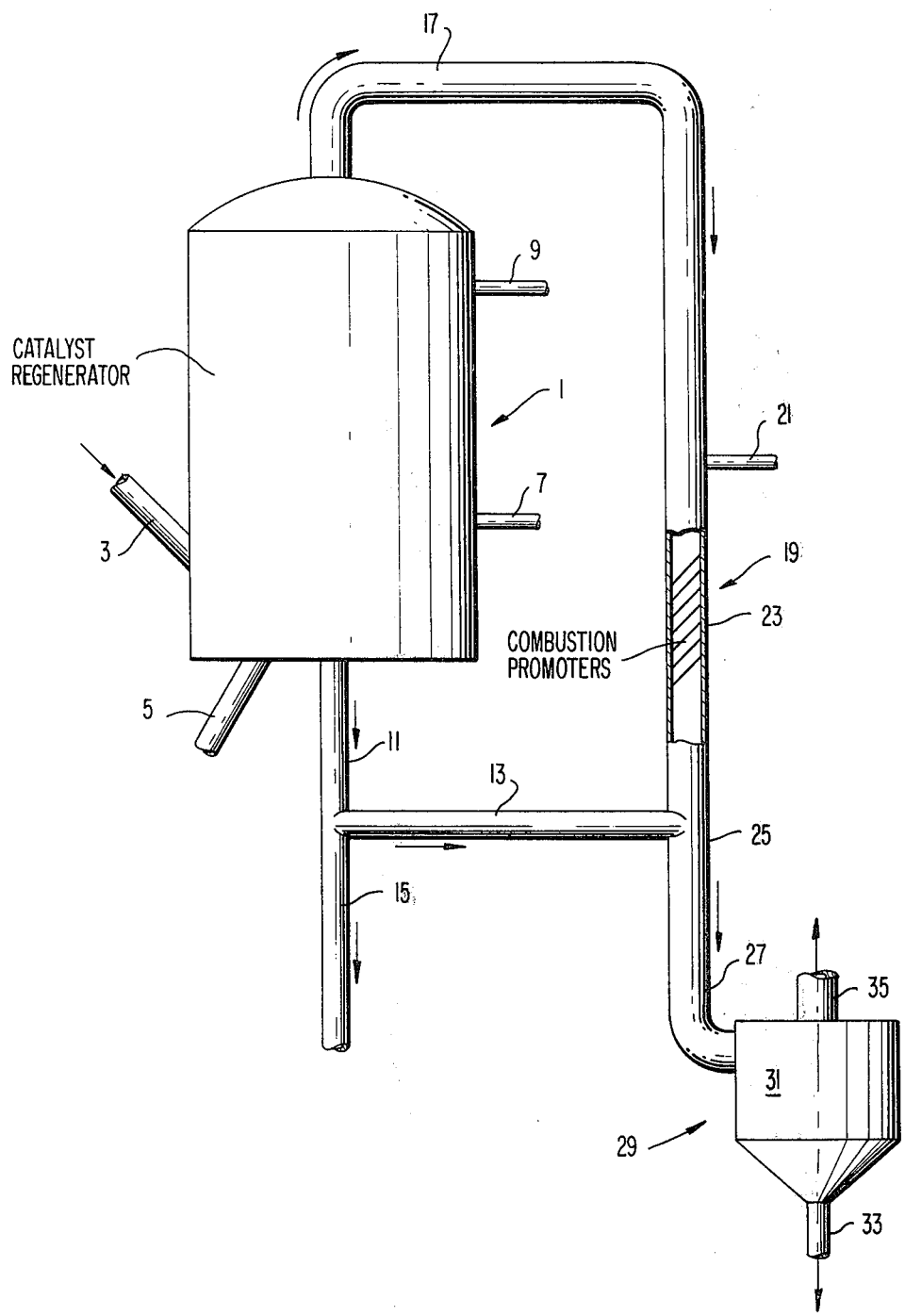

COMBUSTING FLUE GAS IN A CRACKING CATALYST REGENERATION PROCESS

This is a continuation of application Ser. No. 451,140, filed Mar. 14, 1974 now abandoned.

Catalytic cracking of heavy mineral oil fractions is one of the major refining operations employed in the conversion of crude oils to desirable fuel products, such as high-octane gasoline fuels used in spark-ignited, internal combustion engines. Illustrative of "fluid" catalytic conversion processes is the fluid catalytic cracking process, wherein high molecular weight hydrocarbon liquids or vapors are contacted with hot, finely-divided, solid catalyst particles, either in a fluidized bed reactor or in an elongated riser reactor, and the mixture is maintained at an elevated temperature in a fluidized or dispersed state for a period of time sufficient to effect the desired degree of cracking to lower molecular weight hydrocarbons typically present in motor gasolines and distillate fuels. Suitable hydrocarbon feeds boil generally above the gasoline boiling range, e.g., within the range from about 400° to about 1200° F., and are usually cracked at temperatures ranging from about 850° to 1050° F.

In the catalytic process, some non-volatile carbonaceous material, or coke, is deposited on the catalyst particles. Coke comprises highly condensed aromatic hydrocarbons which generally contain a minor amount of hydrogen, say about 4-10 wt. %. As coke builds up on the catalyst, the activity of the catalyst for cracking and the selectivity of the catalyst for producing gasoline blending stocks diminish. The catalyst particles may recover a major proportion of their original capabilities by removal of most of the coke therefrom in a suitable regeneration process.

Catalyst regeneration is accomplished by burning the coke deposits from the catalyst surface with molecular oxygen-containing gas, such as air. Many regeneration techniques are practiced commercially, whereby a significant restoration of catalyst activity is achieved in response to the degree of coke removal. As coke is progressively removed from the catalyst, removal of the remaining coke becomes most difficult, and, in practice, an intermediate level of restored catalyst activity is accepted as an economic compromise.

The burning of coke deposits from the catalyst requires a large volume of oxygen or air. Oxidation of coke may be characterized in a simplified manner as the oxidation of carbon and represented by the following chemical equations:

a. $C + O_2 \rightarrow CO_2$
b. $2C + O_2 \rightarrow 2CO$
c. $2CO + O_2 \rightarrow 2CO_2$.

Reactions (a) and (b) both occur under typical catalyst regeneration conditions, wherein the catalyst temperature may range from about 1050° to about 1300° F., and are exemplary of gas-solid chemical interactions when regenerating catalyst at temperatures within this range. The effect of any increase in temperature is reflected in an increased rate of combustion of carbon and a more complete removal of carbon or coke from the catalyst particles. As the increased rate of combustion is accompanied by an increased evolution of heat, whenever sufficient oxygen is present, the gas-phase reaction (c) may occur. This latter reaction is initiated and propagated by free radicals.

A major problem often encountered and sought to be avoided in the practice, particularly of fluid catalyst regeneration, is the phenomenon known as "afterburning", described, for example, in Hengstebeck, *Petroleum Processing*, McGraw-Hill Book Co., 1959, at pages 160 and 175, and discussed in Oil and Gas Journal, Volume 53 (No. 3), 1955, at pages 93-94. This term is descriptive of the further combustion of CO to $CO_2$, as represented by reaction (c) above, which is highly exothermic. Afterburning has been vigorously avoided in catalyst regeneration processes because it could lead to very high temperatures which may damage equipment and cause permanent deactivation of the catalyst particles. Many fluid catalyst regenerator operations have experienced afterburning, and a very substantial body of art has developed around numerous means for controlling regeneration techniques so as to avoid afterburning. More recently, as operators have sought to raise regenerator temperatures for various reasons, elaborate arrangements have also been developed for control of regenerator temperatures at the point of incipient afterburning by suitable means for control of the oxygen supply to the regenerator vessel as set forth, for example, in U.S. Pat. Nos. 3,161,583 and 3,206,393, as well as in U.S. Pat. No. 3,513,087. In typical contemporary practice, accordingly, with avoidance of afterburning, the flue gas from catalyst regenerators usually contains very little oxygen and a substantial quantity of CO and $CO_2$ in nearly equimolar amounts.

Further combustion of CO to $CO_2$ is an attractive source of heat energy because reaction (c) is highly exothermic. Afterburning can proceed at temperatures above about 1100° F., and liberates approximately 4350 BTU/lb. of CO oxidized. This typically represents about one-fourth of the total heat evolution realizable by complete combustion of coke. The combustion of CO has been performed controllably in a separate CO boiler, after separation of effluent gas from catalyst, as described in, for example, U.S. Pat. No. 2,753,925, with the released heat energy being employed in the generation of high pressure steam. Other uses of such heat energy have been described in U.S. Pat. Nos. 3,012,962 and 3,137,133 (turbine drive) and U.S. Pat. No. 3,363,993 (preheating of petroleum feedstock). Such heat recovery processes serve to minimize the discharge of CO into the atmosphere as a component of effluent gases and to avoid a potentially serious pollution hazard.

This invention relates to an improved fluid catalytic cracking process, and is more specifically directed to the completion of the combustion of CO in fluidized cracking unit catalyst regenerator flue gas, without the use of a conventional CO boiler. The CO combustion is completed in a flue gas combustor, wherein the heat of combustion is recovered by heat exchange with cracking catalyst particles and advantageously utilized within the system. The improved fluid cracking process of this invention includes essentially complete combustion of CO remaining in catalyst regenerator flue gas in a manner which substantially reduced auxiliary heating equipment and expense in the overall fluid cracking unit operation. Advantageously, the process of this invention is adaptable to conventional hydrocarbon catalytic cracking units to reduce operating costs and to replace or assist preheat operations.

This invention is particularly useful in the fluid catalytic cracking of mineral oil feedstocks and is advantageously employed where at least a substantial portion of the cracking is effected in a dilute-phase transfer line or riser reactor system and products having a lower boiling range than the feed are obtained. This invention makes possible an enhanced extent of energy production and conservation within a cyclic process for the catalytic cracking of hydrocarbon feedstocks boiling above the gasoline range, which includes provision for separation of catalyst from conversion products, regeneration of the separated catalyst and recycle of the regenerated catalyst to the reactor for the cracking of additional feedstock, wherein an increased proportion of heat energy is utilized within the cyclic system by improved continuous transfer from the exothermic to the endothermic processing zones. A particularly suitable process for the practice of this invention comprises the fluid catalytic cracking process for the conversion of petroleum gas oils and heavier petroleum stocks to hydrocarbon components suitable for blending into fuels for automotive engines, jet power plants, domestic and industrial furnaces, and the like.

The process of this invention contemplates passing flue gas containing CO and $CO_2$ from a fluid cracking unit catalyst regenerator, at normal regenerator exit temperature and composition, to a combustor in which the CO is ignited in the presence of air or other oxygen-containing gas, and in which the heat of combustion is transferred, either by direct contact or indirect heat exchange to cracking catalyst particles, which are cycled through the fluidized cracking unit. The term combustor is used herein to designate the general area of the flue gas flow path outside of the regenerator vessel at which CO combustion occurs, and is not restricted to a particular structure.

The completion of CO combustion in this invention is accomplished without the necessity for a CO boiler type design, as conventionally employed in the prior art, although the combustor area may be adapted to include combustion initiators and promoters, and includes adaptation for catalyst particle transport and heat transfer, as more fully set forth below. The combustor, which may be in the flue gas or transfer line, may include linings and/or may be constructed of high temperature-resistant ceramics, metals, and the like, in the combustion and heat transfer areas. Such materials, which are generally used in the construction of high-temperature equipment, are well known in the art, and may be chosen according to the specific operating conditions employed.

The regenerator flue gas carbon monoxide combustion of this invention is conducted in the flue gas combustor in the presence of oxygen which is introduced as air or other oxygen-containing source. The oxygen source may be supplied to the transfer line at or just ahead of the point of ignition, or it may be supplied in addition to, or, as the normal oxygen source to the catalyst regeneration vessel. When oxygen is supplied to the combustor via the regeneration vessel, it enters the transfer line with the flue gases, and the necessity for additional oxygen injection equipment may be avoided or reduced. However, when the oxygen source is fed to the combustor, as, for example, by injection from a source other than the regenerator flue gas, close control of combustion rate and, therefore, heat transfer rate, can be attained. This advantage may become particularly important when combustion is desired at two or more locations, as more fully discussed below.

CO combustion completion may be facilitated by various methods. For example, torches may be employed at the point of ignition to achieve ignition temperatures. Such torches include torch oil injection devices, which feed highly flammable, hot burning oil or other fuel, to the desired locations within the flue line. A single torch or a plurality may be employed and arranged at different points within the combustion area. Other methods may be used in addition to, or in place of, torches, and include oxidants, catalyzers, promoters and promotion systems. Among these promoters or catalysts are oxidation-promoting metals and/or their oxides and salts, and include such metals as iron, nickel, vanadium, copper, the rare earths and their oxides and salts, and the like. Such promoters may be in the form of annealed particles, linings, honeycombs, screens, grids, and the like, and may be situated in the transfer line combustor in any known manner, such as, for example, by mechanical support. When such promoters are in a form which could impede catalyst particle flow, e.g., a honeycomb structure, the openings may be large enough to permit catalyst particle flow, or catalyst particles may be fed to the hot flue gas down-stream from the promoters, or the catalyst may recover the heat of combustion by other methods which permit continuous particle flow, e.g., by indirect contact and in such case catalyst-promoter contact can be avoided.

Suitable catalysts employed in this invention include those containing silica and/or alumina. Other refractory metal oxides such as magnesia or zirconia may be employed limited only by their ability to be effectively regenerated under the selected conditions. With particular regard to catalytic cracking, preferred catalysts include combinations of silica and alumina, containing 10–50 wt. % alumina, and particularly their admixtures with "molecular sieves" or crystalline aluminosilicates. Admixtures of clay-extended aluminas may also be employed. Such catalysts may be prepared by any suitable method such as impregnation, milling cogelling, and the like, subject only to provision of the finished catalyst in a physical form capable of fluidization.

Suitable molecular sieves include both naturally-occurring and synthetic crystalline aluminosilicate materials, such as faujasite, X-type and Y-type aluminosilicate materials, and ultrastable, large-pore crystalline aluminosilicate materials. The alkali metal ions contained therein are exchanged in large part by hydrogen ions and polyvalent metal ions, e.g., rare earths, by known techniques. When admixed with, for example, silica-alumina to provide a petroleum cracking catalyst, the molecular sieve content of the catalyst particles is suitably within the range from about 5 to 15 wt. %, desirably 8–10 wt. %. An equilibrium molecular-sieve cracking catalyst may contain as little as about 1 wt. % crystalline material.

The transfer of heat evolved from the CO combustion to the catalyst particles is an important aspect of this invention. The heat may be transferred to the catalyst particles, either directly or indirectly, although direct transfer may maintain heat losses at a minimum. The catalyst particles are transferred to the CO combustor at a point before, at, or downstream from where essentially complete combustion occurs. The catalyst particles which are to be fed to the combustor may normally be taken from the cracking catalyst regenerator or from the outlet of a regenerated catalyst slipstream cooler. They may come from the catalyst stripped, which is normally employed between the regeneration vessel and the cracking reactor, especially at the catalyst exit from the reactor, from a source of fresh catalyst feed, or from a combination of any or all of these sources. The catalyst particles can be fed to the flue gas line or directly to the combustor by conventional methods used to convey particles, such as by pumping or by a conventional standpipe, using flue gas, air, steam, or the like, and the particles may be fed directly into the flue gas transfer line before, at, or just downstream from the CO combustion area. The catalyst particles may be withdrawn from the regenerator with cyclones via a dip-leg by lift gases, or the particles may be allowed to flow through the regeneration bed and be withdrawn directly from the bed with the flue gas. Withdrawal may be accomplished by employing specially equipped by-passes around the regenerator cyclones with automatic temperature control. The catalyst particles may be combined with the flue gas and the mixture may flow at a controlled temperature through a chimney in the regenerator vessel plenum floor having control valves. The control valves could be responsive to the automatic temperature control of the by-passes and deliver temperature-controlled catalyst particles to the combustor via the flue gas line to recover heat generated from CO combustion from either the CO contained in the catalyst particle-flue gas mixture, or from a separate flow of flue gas, or both.

Combustion of CO-containing catalyst regenerator flue gas exiting from the regenerator at temperatures of, for example about 1050° to 1300° F., will generate about 4,300 BTU/lb. of CO oxidized, which heat may be substantially recovered by heat exchange with the cracking unit catalyst particles. Typically flue gas from a catalyst regenerator contains, for example, from about 3 to about 10 or more percent carbon monoxide and amounts of carbon dioxide in this range. A mixture of one-to-one $CO_2/CO$ flue gas, for example, may result in a gas temperature increase of 600° F. or more in the substantial absence of catalyst, e.g., an increase of about 1000° F. The actual temperature increase in the presence of the catalyst is dependent upon the mass flow rate of the catalyst particle "heat sink". The catalyst flow rate is dependent upon the desired heat exchange and catalyst temperature increase. Flue gas flow rates to the special heat recovery facilities may, for example, be as low as about 10 and as high as about 15 pounds per pound of coke on the catalyst passed to the regenerator from the cracking reactor, but preferably the flue gas flow rates are in the range of about 11 to 13 pounds per pound. Catalyst particle flow rates may be, for example, from about 1 to about 10, preferably from about 1 to about 6, e.g., about 4, pounds per pound of flue gas which passes in heat exchange relationship with the catalyst.

The essentially completely combusted flue gas from the combustion processes of this invention has an unusually low carbon monoxide content. Whereas flue gas from conventional regeneration of cracking catalyst usually contains from about 6 to 10 percent carbon monoxide, a similar amount of carbon dioxide and very little oxygen, the flue gas from regeneration and subsequent carbon monoxide combustion in accordance with this invention generally contains less than about 0.2 percent CO, for example, no more than about 500 to 1000 parts per million carbon monoxide. Advantageously, the flue gas carbon monoxide content is even lower, for example, within the range from about 0 to about 500 ppmv. The oxygen content of the flue gas is, of course, not of primary importance from an ecological point of view and may often vary from about 0.1 to about 10 percent, advantageously being within the range from about 1 to about 3 percent and preferably no more than about 2 percent in order to restrict the amount of flue gas and conserve heat within the regeneration reactor and combustor system. From a process point of view, heat recovery by downstream combustion of carbon monoxide in the carbon monoxide combustor process of this invention, results in consequent substantial savings in process equipment and operational costs while still meeting the existing standards for ambient air quality for carbon monoxide emissions. In one embodiment, Co-containing flue gas may be mixed with catalyst and ignited in the line and combustion completed, e.g., by passing the mixture through combustion promoters, and may be passed through a heat recovery zone in the line through which added catalyst particles are fed. The hot, completely combusted flue gas continues to pass through the flue gas line to another heat recovery zone through which other catalyst particles pass at a rate sufficient to recover remaining recoverable heat. The catalyst streams may emanate from a single source or from separate sources, and may be combined after heat transfer for a single purpose or may be continued as separate streams for different purposes. Many other variations may be made, depending upon the particular requirements of a given system. For example, two or more combustion areas may be employed wherein partial combustion is achieved by close oxygen control, and each is followed by a contiguous heat exchange zone. In this or the above embodiments many variations may be made. For example, two or more particle streams may receive any predetermined proportion of the recoverable heat, rather than equal amounts. Likewise, similar linear flow rates may be employed with varying volumetric flow rates. The choice of setting dependent and independent variables is one of design, and, ideally, the system may advantageously be designed so as to permit variation of any one or more of the conditions involved.

Other embodiments of this invention may employ indirect heat transfer between the combusted flue gas and the catalyst particles. Heat transfer media, such as high heat capacity fluids, may convey the heat from the gases to the particles or the particles may be fed through a heat exchange system for indirect heat exchange with the flue gas. For example, the flue gas may pass through one side of a tubular heat exchanger and the particles may pass through the other side to receive substantially all the heat of combustion. The indirect heat exchange system may alternatively be an annular space heat exchanger, whereby combusted gases surround an inner tube or pipe containing the particles. This may be accomplished by forming an annular space within the transfer line by arranging a pipe or tube coaxially and concentrically within the line and passing the catalyst particles through it.

As stated either direct or indirect heat exchange methods may be utilized in this invention, and such methods may include one or more heat recovery or heat exchange zones. Where a plurality of zones are used, a single combustion area or a plurality of such areas are advantageously included with a plurality of any direct or indirect heat exchange system, or with any combination of such systems, depending upon the ultimate operations in which the heated particles will be employed.

In those embodiments in which direct heat exchange occurs, the catalyst particles may be recovered by conventional cyclones or other gas-particle separating devices. After the catalyst particles leave the combustion heat exchange area, whether the heat exchange is direct or indirect, they may be returned to the cracking system by known particle conveying means. In one embodiment, the transfer line combustor or combustors are placed in a position of greater elevation than the component in the cracking system to which the heated particles are returned, and the return is conveniently accomplished by gravitation. Alternatively, the particles may be conveyed to the combustors by gravitational means and, after heat recovery, may be lifted, as, for example, by standpipe or high-level hoppers, to a height where distribution or return may be conducted, selectively or otherwise, by gravitation, or they may be returned directly by such lifting methods. In yet another embodiment, the heated catalyst particles are pumped directly to any desired component in the fluidized cracking system.

As mentioned, the heated catalyst particles may be returned to any one or a number of locations within the cracking system. Preferably, the particles, receiving heat from the exothermic combustion of the CO, and are fed to a component in which an endothermic reaction occurs, e.g., the cracking zone. However, the catalyst particles may be returned to either endothermic or exothermic reaction sites and such sites may use additional heat, and the sites are generally at a temperature lower than that of the heated catalyst particles. Thus the catalyst particles may be returned or sent to any area which may use heat which may be transferred from the particles.

Among the components or areas in the fluidized cracking unit to which the heated catalyst particles may supply heat are the catalyst regeneration vessel, the reactor, and various preheat furnaces and recylce lines, as well as product hydrocarbon lines leading to the fractionating column and the like. When heated catalyst particles are recycled or sent to the catalyst regenerator, they may be introduced into any one or a combination of locations which will usefully accept the additional heat. They may be introduced directly into the regenerator dense fluidized catalyst bed to assist in the initiation or sustaining of burning, which removes the residual coke from the particles passed to the vessel from the reactor, and thereby substantially reduce or even obviate auxiliary heating needs, e.g., oil preheaters or fuel burners in the dense bed. In addition, the heated particles may be combined with coked catalyst feed just before or at the point of entry to the regenerator. Other points of introduction peculiar to particular regeneration systems may likewise be used.

When the particles are introduced to the reactor, they may be combined with regenerated particles being returned to the reactor, or they may be separately injected into the reactor. Additionally, the heat in the catalyst particles due to heat exchange in the CO combustor, may be transferred to hydrocarbons within the process. This may be accomplished by known heat exchange methods, as for example, discussed above, and the heat may be transferred to fresh, uncracked hydrocarbon feed to bring it up to reactor temperature and to thereby assist the conventional fresh feed reactor preheater. The heat of the catalyst particles may also be transferred to cracked hydrocarbon product by conventional means as the cracked hdyrocarbons exit the reactor and enter the fractionator, or to water to make steam.

By the process of this invention, flue gas entering the CO combustion area release sufficient heat upon completion of combustion to be equivalent to a 600° F. or much higher temperature rise in the catalyst. This can be done without at any time heating the catalyst above about 1500° F. In one embodiment, cooled catalyst is used as the coolent to reduce the flow rates, e.g., catalyst particles may be quickly added to the combusted hot flue gas so that the temperature of the resulting mixture may immediately drop below about 1500° F. For example, when the catalyst particles are removed from the regenerator at typical regeneration temperatures of about 1050 to 1300° F., the particles may be cooled in a conventional catalyst cooler by about 150° to 700° F. before heat is transferred to them from the completely combusted hot flue gases. Typically, where the catalyst regeneration temperature is about 1175° F., the catalyst particles may be cooled down to a temperature between about 475° and about 1025° F.

The catalyst temperature is preferably kept below about 1500° F. because catalyst particles are somewhat temperature-sensitive in that high temperatures, e.g., above about 1450° to 1500° F. for cracking catalysts, may have detrimental effects on them and impair their catalytic abilities as well as their structural characteristics. It is, therefore, desirable in practicing the process of the present invention to conduct staying of heat release and heat recovery. Alternatively, the exceedingly hot gas may be suddenly contracted with the quantity of catalyst particles needed to cool the mixture to below 1500° F. without allowing the particles at any time to exceed 1500° F. The safe maximum temperature for each system depends upon the particular catalyst employed, and such temperatures are well known in the art. The temperature of the catalyst particles which recover the CO heat of combustion is generally raised up to about 300° to 1000° F. and is preferably not raised above about 1500° F. final particle temperature.

This invention is more fully described by the following example and drawing which is set forth for illustrative purposes.

Mid-continent gas oil (23.4° API), having a boiling range from 650° to 1050° F., is cracked in a fluidized transport-type reactor at an average cracking temperature of 960° F. The throughput ratio (weight total feed/weight fresh feed) is 1.34 and the total feed rate is 36,000 bbl/day. The catalyst particles comrpise silica-alumina together with 10 wt. % crystalline aluminosilicate or molecular sieve material (Y-type ion exchangd with hydrogen and rare earth metals) and are circulated between the reactor and regenerator at a rate of 19.6 tons/minute. The weight ratio of catalyst to oil in the cracking zone is 3.7.

Effluent from the riser reactor is passed to a separation zone and fed into a cyclone separator. Hydrocarbon products are removed from the cyclone separator and spent catalyst is passed downwardly through a cyclone dip-leg into a stripping zone maintained at 950° F. The settled catalyst is stripped with steam to remove the remaining volatile material prior to regeneration.

Stripped, spent catalyst, containing 0.9 wt. % coke thereon, is fed to the fluidized cracking unit catalyst regenerator vessel, shown schematically in the FIG- URE, generally as 1. The spent catalyst is fed to the vessel via inlet line 3 and is fluidized by rising gases fed to the vessel through air line 5 and/or through additional lines at the bottom of the vessel (not shown). The fluidized particles are maintained in a dense bed at about 1175° F. by combustion of the coke and combustion of torch oil, as injected through line 7 in the FIGURe as needed. The air rate is set at approximately 11 lbs. air per lb. coke on the spent catalyst and closely controlled to prevent undesired or excessive "afterburning" within the regeneration vessel. Cyclones and other conventional equipment (not shown) are contained within the reaction vessel and effecively separate the flue gas from the fluidized particles. Auxiliary temperature lowering means are maintained in the upper portion of the vessel, such as steam injector 9 in the FIGURE to avoid afterburning in the vessel.

Regenerated catalyst particles are removed from the regenerator via line 11 where they are separated into two streams and are, in part, sent to the flue gas combustor heat exchange area via line 13 and, in part, returned to the cracking reactor via line 15. In this example, about half of the particles is fed to the flue gas transfer line as compared to the flow back to the reactor, although less or more, of the catalyst particles may be fed to the transfer line.

Flue gas exits the regenerator via flue gas line 17 and passes to the combustor, shown generally as 19. Air is introduced at line 21 to the flue gas which arrives at the combustion area at about 1200° F., and the gas is ignited as by an oil torch (not shown), and the combustion is sustained by iron oxide grid promoters at 23. The combusted flue gas continues down the transfer line and, just downstream from combustion area 19, regenerated catalyst particles from line 13 are combined in high turbulence with the gaseous mass. The catalyst particle-combusted gas mixture passes down the transfer line as very rapid direct heat transfer occurs in a short zone in the area 27. The catalyst particles and flue gas temperatures reach an equilibrium and heat transfer is essentially complete before the mixture arrives at cyclone 29 where it separates at 31. The heated catalyst particles exit cyclone 29 at 33 for passage back to the cracking system, and the flue gas exits at 35.

In this example, hot catalyst particles enter the transfer line at about 1175° F. and exit the line at about 1425° F. These catalyst particles are then conveyed to the catalyst regenerator where heat is transferred from the hot catalyst to the cooler entering catalyst. Individual particles have not exceeded about 1500° F. at any point. The flue gas entering the flue gas line contained about 5.0% carbon monoxide and after combustion completion the exiting flue gas contained less than 0.2% carbon monoxide.

It is claimed:

1. A hydrocarbon catalytic cracking process, including hydrocarbon cracking and catalyst regeneration, comprising:
   regenerating fluidized hydrocarbon cracking catalyst particles, which have been deactivated with coke deposits while employed in said hydrocarbon cracking, in a catalyst regenerator at regeneration temperature by contact with an oxygen-containing gas stream to combust coke on the catalyst and produce a carbon monoxide-containing flue gas,
   passing said carbon monoxide-containing flue gas from the catalyst regenerator,
   oxidizing said carbon monoxide-containing flue gas from the catalyst regenerator to substantially completely combust carbon monoxide contained therein to form a combusted effluent of reduced carbon monoxide content,
   withdrawing catalyst from the catalyst regenerator separately from said carbon monoxide-containing flue gas,
   passing said withdrawn catalyst, which is relatively free of carbonaceous material, in heat exchange relation with said combusted effluent to transfer heat generated from the carbon monoxide combustion to said cracking catalyst particles, and
   conveying the resulting heated catalyst particles to said catalytic cracking process.

2. The process of claim 1 wherein said transfer of heat is accomplished by direct contact between the combusted effluent and the catalyst particles.

3. The process of claim 2 wherein said transfer of heat is conducted within a flue gas transfer line.

4. The process of claim 1 wherein said resulting hot catalyst particles are conveyed to a cracking reactor.

5. The process of claim 1 wherein said resulting hot catalyst particles are conveyed to an area in which heat is exchanged with and received by hydrocarbons in the hydrocarbon cracking process.

6. The process of claim 1 wherein said resulting hot catalyst particles are conveyed to said catalyst regenerator.

7. A hydrocarbon catalytic cracking process, including the completion of catalyst regeneration carbon monoxide-containing flue gas combustion, comprising:
   regenerating fluidized hydrocarbon cracking catalyst particles which have been deactivated with coke deposits while employed in the hydrocarbon cracking process, in a catalyst regenerator at regeneration temperature by contact with an oxygen-containing gas stream to combust coke on the catalyst to produce a carbon monoxide-containing flue gas,
   passing said carbon monoxide-containing flue gas from the catalyst regenerator,
   combining said flue gas with an oxygen-containing gas to form a combustible gaseous mixture,
   igniting said combustible gaseous mixture to substantially complete the combustion of the carbon monoxide contained therein,
   transferring heat generated from said carbon monoxide combustion at a plurality of heat transfer areas to a plurality of hydrocarbon cracking catalyst particle streams containing particles withdrawn from said catalyst regenerator separately from said carbon monoxide-containing flue gas, said particles being relatively free of carbonaceous material, and
   conveying resulting hot hydrocarbon catalyst particle streams to the hydrocarbon cracking process for heat exchange.

8. The process of claim 7 wherein said transfer of heat in at least one heat transfer area is accomplished by direct contact between the combusted gaseous mixture and a catalyst particle stream.

9. The process of claim 8 wherein said transfer of heat in at least one heat transfer area is conducted within a flue gas transfer line exchanger.

10. The process of claim 7 wherein at least one of said resulting hot catalyst particle streams is conveyed to a cracking reactor within the hydrocarbon cracking process.

11. The process of claim 7 wherein at least one of said resulting hot catalyst particle streams is conveyed to an area in which heat is exchanged with and received by hydrocarbons within the hydrocarbon cracking process.

12. The process of claim 7 wherein at least one of said resulting hot catalyst particle streams is conveyed to said catalyst regenerator.

13. The process of claim 7 wherein at least two of said resulting hot catalyst particle streams are conveyed to different areas within the hydrocarbon cracking process.

14. The process of claim 7 wherein said particles from said catalyst regenerator to which the heat from the carbon monoxide combustion is transferred are precooled to about 150° to about 700° F. below the regeneration temperature before said heat is transferred.

15. A hydrocarbon catalytic cracking process, including hydrocarbon cracking and catalyst regeneration, comprising:

regenerating fluidized hydrocarbon cracking catalyst particles, which have been deactivated with coke deposits while employed in said hydrocarbon cracking, in a catalyst regenerator at regeneration temperature by contact with an oxygen-containing gas stream to combust coke on the catalyst and produce a carbon monoxide-containing flue gas, passing said carbon monoxide-containing flue gas from the catalyst regenerator, oxidizing said carbon monoxide-containing flue gas from the catalyst regenerator to combust carbon monoxide contained therein to form a combusted effluent of reduced carbon monoxide content, withdrawing catalyst from the catalyst regenerator separately from said carbon monoxide-containing flue gas, passing said withdrawn catalyst, which is relatively free of carbonaceous material, in heat exchange relation with said combusted effluent to transfer heat generated from the carbon monoxide combustion to said cracking catalyst particles, and conveying the resulting heated catalyst particles to said catalytic cracking process.

* * * * *